United States Patent [19]

Reimer et al.

[11] Patent Number: 5,054,459
[45] Date of Patent: Oct. 8, 1991

[54] PREHEATING DEVICE FOR INTERNAL COMBUSTION ENGINE INTAKE AIR AND METHOD OF MAKING SAME

[75] Inventors: Uwe Reimer, Hochdorf; Jürgen Kretschmer; Klaus Brecht, both of Stuttgart, all of Fed. Rep. of Germany

[73] Assignee: Daimler-Benz AG, Fed. Rep. of Germany

[21] Appl. No.: 529,440

[22] Filed: May 29, 1990

[30] Foreign Application Priority Data

May 26, 1989 [DE] Fed. Rep. of Germany ....... 3917107

[51] Int. Cl.$^5$ ............................................. F02M 31/00
[52] U.S. Cl. ..................... 123/549; 219/206
[58] Field of Search ................. 123/549, 142.5 E; 219/206, 207, 552, 553, 545

[56] References Cited

U.S. PATENT DOCUMENTS

| | | | |
|---|---|---|---|
| 3,892,215 | 7/1975 | Hickling et al. | 219/206 |
| 4,395,994 | 8/1983 | Goto et al. | 123/549 |
| 4,825,049 | 4/1989 | Richborn | 219/545 |
| 4,845,343 | 7/1989 | Aune et al. | 219/545 |

Primary Examiner—Noah P. Kamen
Attorney, Agent, or Firm—Evenson, Wands, Edwards, Lenahan & McKeown

[57] ABSTRACT

A device is described for electrically pre-heating the intake air or the intake mixture of an internal combustion engine having at least on intake pipe. So that low-loss pre-heating, without considerable impairment of flow in the intake pipe, can also be realized in such zones in which the intake pipe has a geometrically irregular shape. It is proposed to perform the pre-heating via a layer of high electrical resistance applied to the inner surface of the intake pipe.

23 Claims, 1 Drawing Sheet

PREHEATING DEVICE FOR INTERNAL COMBUSTION ENGINE INTAKE AIR AND METHOD OF MAKING SAME

BACKGROUND AND SUMMARY OF THE INVENTION

The invention relates to a device for pre-heating the intake air or the intake mixture of an internal combustion engine having at least one intake pipe.

It is known from German Utility Model 7,816,169 to preheat the intake air via a heating wire wound around the intake manifold. This device is principally suitable for intake manifolds or intake pipes having a geometrically regular shape, as is the case in manifolds having a circular cross section. However, if the intake air is to be pre heated in a manifold zone in which the contour of the intake manifold is relatively irregular, for example in mixture compressing internal combustion engines in the zone of the fuel injection, continuous contact of the heating wire with the intake-pipe outer surface and thus adequate heat transfer into the wall of the intake pipe can no longer be achieved or, if at all, only at a relatively high cost. In addition, on account of the fact that the heating wire is arranged on the outer surface of the intake manifold, the heat loss to the surrounding area during a heating phase is very high. Furthermore, it is known, in order to pre heat the intake air, to insert an electric heating element into the intake pipe (German Patent Specification 3,426,469); in this case, however, there is a clear reduction in the cross-section of flow.

An object of the invention is therefore to create a device of the type described above with which, without considerably impairing the intake-air or intake mixture flow, low-loss pre-heating of the intake air or the intake mixture can also be achieved in the zones of the intake pipe in which the intake pipe has a geometrically irregular, i.e. a spatially curved, shape.

This object is achieved according to the invention by providing a device for pre-heating in certain zones the intake air or the intake mixture of an internal combustion engine having at least one intake pipe, comprising an electric conductor which, in an active state, delivers resistance heat to the intake air or the intake mixture, the electric conductor being a layer of high electrical resistance applied to one of the inner surface of the intake pipe and the wall of the intake pipe, wherein the layer is a malleable insert of carbon fibers.

With the use of a layer having a high electrical resistance, according to the invention it is possible to also pre-heat the intake air or the intake mixture in such manifold sections which have a geometrically completely irregular shape (spatial curvature).

In preferred embodiments of the invention, a fabric consisting of many individual electric conductors of small diameter can be adapted without problem to the respective inner contour of the manifold. It is thus ensured that the heating facility does not cause any considerable increase in the flow resistance in the intake pipe. The flow in the intake pipe remains completely unaffected if the layer is integrated in the wall of the manifold.

Especially with regard to the flow of the intake gases, it is advantageous in the case of a layer applied to the inner surface of the intake pipe to laminate this layer onto the intake-pipe inner wall, in which arrangement a heat-insulating intermediate layer provided in the zone between the layer and the intake-pipe outer surface keeps the heat transfer via the intake pipe wall to the surrounding area to a minimum. This applies in particular to an intake pipe made of a metallic material. Very rapid vaporization of the fuel injected into the intake pipe of a mixture-compressing internal combustion engine can be achieved if the layer is arranged in the impingement area of the fuel stream.

With carbon fibers as electric conductors, relatively high temperatures can be achieved even with short conductor lengths on account of the high specific resistance of this material. Applied to a fabric made from this material, this means that, related to a certain fabric area and a certain quantity of supplied energy, a relatively low fabric density (packing density) is sufficient to obtain the total resistance of the fabric required to reach a pre determined temperature.

Other objects, advantages and novel features of the present invention will become apparent from the following detailed description of the invention when considered in conjunction with the accompanying drawings.

DETAILED DESCRIPTION OF THE DRAWINGS

Figure 1:
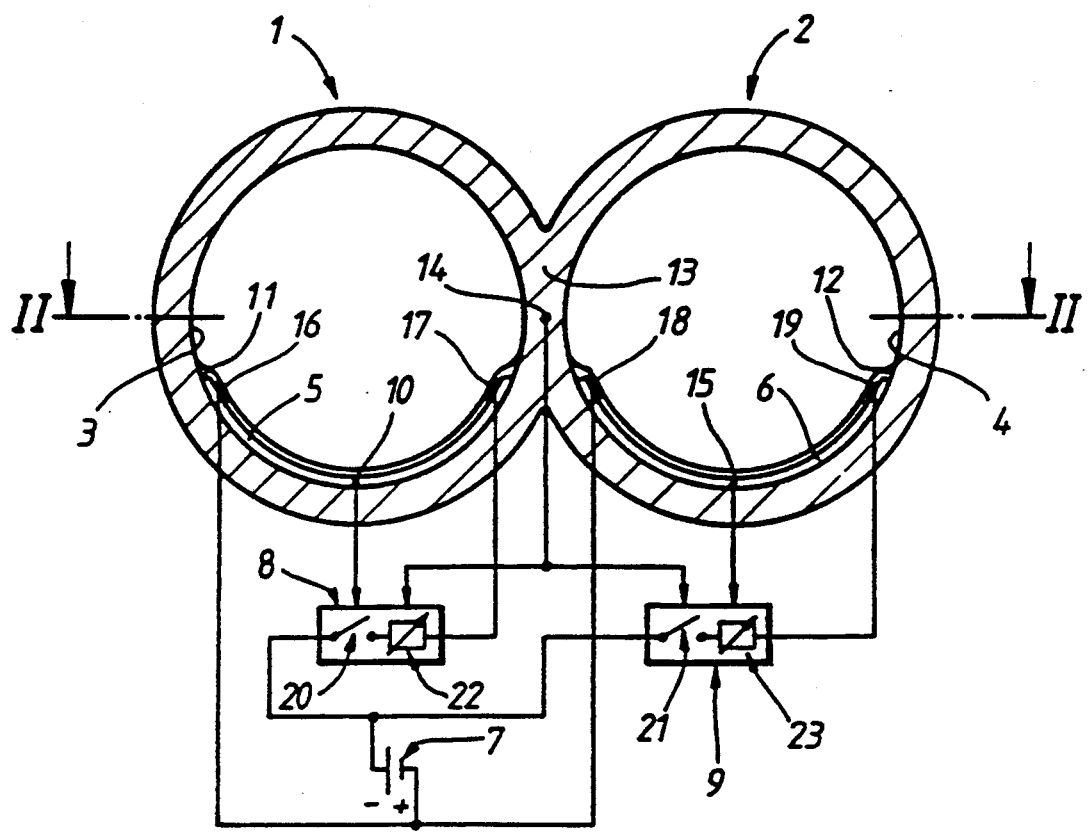
FIG. 1 is a schematic sectional view which shows a device installed at engine intake pipes, constructed according to a preferred embodiment of the invention.

FIG. 1 shows a cross-sectional representation of two intake pipes 1 and 2 of a mixture-compressing internal combustion engine which are made of a carbon-fiber-reinforced plastic. A carbon-fiber fabric 5 or 6 consisting of longitudinal 25 or 27 and cross fibers 24 or 26 (see FIG. 2) and adapted beforehand to the inner contour of the respective intake pipe 1 or 2 is laminated onto the inner surface 3, 4 of each intake pipe 1, 2 in each case by means of an epoxy resin 11, 12. Both fabrics 5, 6, in parallel with one another, are connected to the battery 7 of the vehicle driven by the internal combustion engine.

One electronic control unit 8 and 9 each is arranged in each of the two circuit paths supplying the fabrics 5, 6. In this arrangement, a signal corresponding to the temperature of the fabric 5 is supplied to the control unit 8 via a measuring sensor 10 arranged in the fabric 5, and a signal corresponding to the intake-pipe temperature is supplied to the control unit 8 via a measuring sensor 14 arranged in the intermediate wall 13. A signal corresponding to the temperature of the fabric 6 is supplied to the control unit 9 via a measuring sensor 15 arranged in the fabric 6, and the intake-pipe wall temperature is likewise supplied to the control unit 9 via the sensor 14. The two fabrics 5, 6 are electrically connected via copper-braid tracks 16 and 17 or 18 and 19 which are adhesively bonded onto the carbon-fiber fabric 5 or 6, for example by means of conductive silver. The two copper-braid strips 16 and 18 respectively arranged in each case on the left hand side in the drawing of fabric 5, 6 are here connected to the positive terminal of the voltage source 7, and the two copper-braid strips 17 and 19 respectively arranged in each case on the right hand side are connected to the negative terminal of the voltage source 7.

During a cold start of the internal combustion engine, i.e. when the intake-pipe wall temperature determinable via the sensor 14 lies below a predetermined limit value, a switch 20 or 21 provided in the electronic control unit 8 or 9 is closed in each case. Thus a current flows via the two potentiometer 22 and 23, which are likewise provided in the electronic control units 8 and 9 respectively and which are set to their lowest resistance at the start of a heating phase, and via the two carbon fiber fabrics 5 and 6 respectively, which, as a result of the relatively high total resistance of the individual fabrics 5 and 6 respectively, leads to the same being heated. The fabrics 5, 6 are here designed in such a way that they reach a temperature of about 120° C. within about 5 seconds after the start of a heating phase (closing of the switches 20 and 21 resp.). In the two fabrics 5 and 6 the cross threads 24 and 26 respectively act like resistors which ar connected in parallel and which are short-circuited by the longitudinal threads 25 and 27 respectively, which in turn form small individual resistors.

As a result of the heating of the two fabrics 5 and 6, an increase in the intake-air temperature is achieved, injection directly towards the two fabrics 5 and 6 leading to immediate vaporization of the fuel and thus to an optimum mixture formation. To laminate the two carbon-fiber fabrics 5 and 6 onto the intake-pipe inner wall 3 or 4, an epoxy resin is used which has a temperature stability of about 200° C. When switches 20 and 21 respectively are closed, a predetermined fabric temperature can be regulated separately for each fabric 5, 6 via the electronic control units 8 and 9 respectively; that is, if one of the two sensors 10 or 15 should signal that the temperature in the respective fabric 5 or 6 is too high, a reduction in the current flowing via the respective fabric 5 or 6 and associated therewith a reduction in the fabric temperature is effected via the respective potentiometer 22 or 23 by a corresponding increase in the resistance. Accordingly, if the fabric temperature is too low, an increase in the fabric temperature is effected via the respective potentiometer 22 or 23 by an appropriate reduction in the resistance.

If the intake-pipe wall 13 has reached a predetermined operating temperature (sensor 14), the electric circuits for both fabrics 5 and 6 are interrupted via the electronic control units 8 and 9 by opening of the switches 20 and 21 so that the pre-heating is switched off.

For the sake of clarity, the two carbon-fiber fabrics 5 and 6 and the epoxy-resin layers 11 and 12 have been shown considerably oversized in FIG. 1 compared with the intake-pipe dimensions. In reality, the height of a fabric 5 or 6 plus the epoxy-resin layer 11 or 12 is infinitely small compared with the intake-pipe diameter. The two fabrics 5 and 6 including the copper-braid tracks 16, 17, 18 and 19 are completely covered by the epoxy resin layer 11 or 12, as a result of which development of a short circuit via the intake mixture itself is impossible.

In the event of the intake-pipe being made of a metallic material, the fabric and intake pipe inner wall must be insulated from one another in order to prevent a short circuit via the intake pipe and thus failure of the pre-heating via the fabrics. An epoxy resin layer can likewise be used as an insulator. Likewise, the connecting lines which run through the intake pipe wall must of course also be insulated in this case.

Particularly low-loss pre-heating can be achieved when a heat-insulating intermediate layer is arranged in the zone between the carbon-fiber fabric and the intake-pipe outer surface. This intermediate layer can be provided, for example, in the intake-pipe wall or between the fabric itself and the intake-pipe inner surface The invention is not restricted to the fabric being laminated onto the inner surface of the intake pipe; it is likewise conceivable to adhesively bond the fabric to the intake-pipe inner wall Of course, attention likewise has to be paid here to an insulation relative to the intake-air or intake-mixture flow. In a further development of the invention it is likewise possible to integrate the fabric in the intake-pipe wall.

Figure 2:
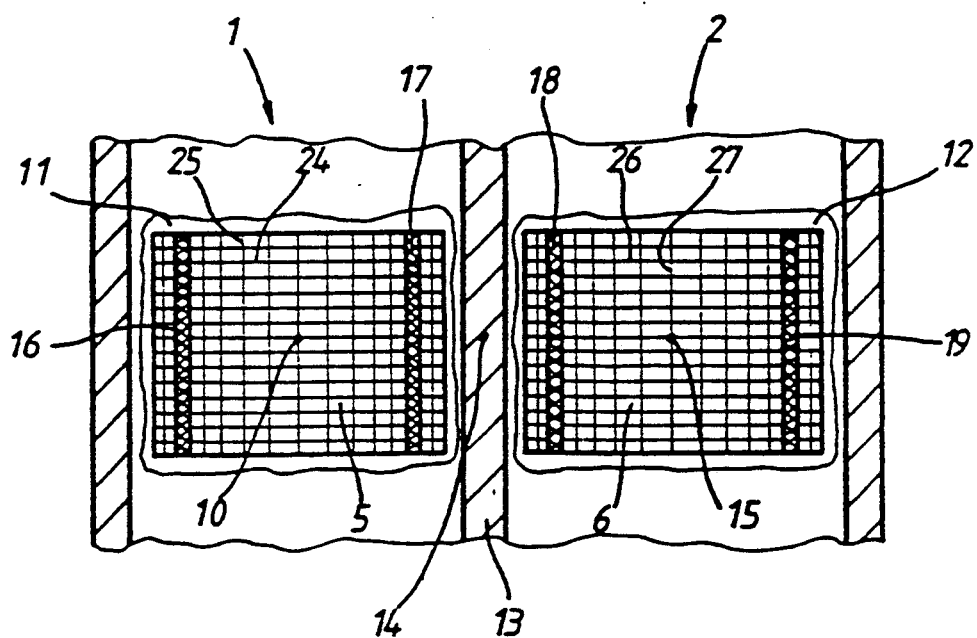
FIG. 2 shows a sectional representation of FIG. 1 taken along line II—II.

In the exemplary embodiment according to FIGS. 1 and 2, provision is made to laminate the fabrics 5 and 6 only over part of the intake-pipe inner periphery. It is likewise possible, provided a corresponding heating capacity is required and this heating capacity can also be provided to a sufficient extent by the voltage source, to laminate or apply the fabric over the entire inner periphery of the intake pipe.

In further development of the invention, a sheet heating element can also be employed instead of a carbon-fiber fabric. This sheet heating element consists of a polyamide sheet photogalvanically coated with conductor strips, which is likewise applied to the intake pipe inner surface, for example by adhesion.

Furthermore, it is possible to design the layer not as a fabric but in the form of a cluster (fibers laid loosely one on top of the other), a felt, a nonwoven, individual fiber bundles (rovings), individual bands or individual fibers.

Instead of an epoxy resin, a duroplastic or a thermoplastic having an appropriately required temperature stability can also be used as bonding agent for the laminating operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Intake apparatus for an internal combustion engine comprising:
    at least one intake pipe for conveying intake gases to an internal combustion engine,
    and an electrical resistance heating device for heating the intake gases as they are conveyed in the intake pipe,
    wherein said heating device includes a malleable layer of carbon fibers laminated to an inwardly facing surface of the intake pipe and an electric current supply circuit for supplying current to the carbon fibers, whereby said heating device is adapted to be applied to irregularly shaped intake pipe inwardly facing surfaces.

2. Apparatus according to claim 1, wherein two of said intake pipes are provided which are made together of a carbon-fiber-reinforced plastic, each of said intake pipes including one of said electrical resistance heating devices.

3. Apparatus according to claim 1, wherein said malleable layer extends over only a portion of the circumference of the inwardly facing surface of the intake pipe.

4. Apparatus according to claim 3, wherein two of said intake pipes are provided which are made together of a carbon-fiber-reinforced plastic, each of said intake pipes including one of said electrical resistance heating devices.

5. Apparatus according to claim 4, wherein said electrical circuits include sensors for sensing the temperature of the intake pipe and for sensing the temperature of the malleable layer.

6. Apparatus according to claim 3, wherein the layer is formed as a fabric.

7. Apparatus according to claim 6, wherein a heat insulating intermediate layer is provided between the fabric and the intake pipe inwardly facing surface.

8. Apparatus according to claim 6, wherein the intake pipe is made of an electrically non-conducting material in the zone of the applied fabric.

9. Apparatus according to claim 8, wherein a heat insulating intermediate layer is provided between the fabric and the intake pipe inwardly facing surface.

10. Apparatus according to claim 6, wherein the layer is laminated in place by a bonding agent.

11. Apparatus according to claim 10, wherein the intake pipe is made of an electrically non-conducting material in the zone of the applied fabric.

12. Apparatus according to claim 10, wherein a heat insulating intermediate layer is provided between the fabric and the intake pipe inwardly facing surface.

13. Apparatus according to claim 10, wherein the bonding agent is an epoxy resin with a temperature stability of up to about 200° C.

14. Apparatus according to claim 13, wherein the intake pipe is made of an electrically non-conducting material in the zone of the applied fabric.

15. Apparatus according to claim 13, wherein a heat insulating intermediate layer is provided between the fabric and the intake pipe inwardly facing surface.

16. A method of making apparatus for preheating intake gases in an intake pipe for an internal combustion engine, comprising:
    laminating a malleable layer of carbon fibers to an inwardly facing surface of an intake pipe such that said malleable layer extends over only a portion of the circumference of the inwardly facing surface of the intake pipe, whereby said malleable layer is adapted to be applied to irregularly shaped intake pipe inwardly facing surfaces,
    and connecting an electric current supply circuit for supplying current to the carbon fibers.

17. A method according to claim 16, wherein a heat insulating intermediate layer is provided between the fabric layer and the intake pipe surface.

18. A method according to claim 16, wherein the at least one intake pipe is made of an electrically non-conducting material in the zone of the applied fabric layer.

19. A method according to claim 18, wherein a heat insulating layer is provided between the fabric layer and the intake pipe surface.

20. A method according to claim 16, wherein the layer is formed as a fabric layer.

21. A method according to claim 20, wherein the fabric layer is laminated to the inner surface of the intake pipe by means of a bonding agent.

22. A method according to claim 21, wherein the bonding agent is an epoxy resin with a temperature stability of up to about 200° C.

23. A method according to claim 22, wherein the at least one intake pipe is made of an electrically non-conducting material in the zone of the applied fabric layer.

* * * * *